(No Model.)

J. D. OTIS & J. M. HARPER.
HOSE PATCH.

No. 492,047. Patented Feb. 21, 1893.

Witnesses:
Leo Raabe
R. N. McCormick

Inventors:
James M. Harper,
John D. Otis.
by W. V. Tefft, Atty.

UNITED STATES PATENT OFFICE.

JOHN D. OTIS AND JAMES M. HARPER, OF PEORIA, ILLINOIS; SAID OTIS ASSIGNOR TO SAID HARPER.

HOSE-PATCH.

SPECIFICATION forming part of Letters Patent No. 492,047, dated February 21, 1893.

Application filed May 19, 1892. Serial No. 433,522. (No model.)

*To all whom it may concern:*

Be it known that we, JOHN D. OTIS and JAMES M. HARPER, citizens of the United States, residing at Peoria, in the county of Peoria and State of Illinois, have invented certain new and useful Improvements in Hose-Patches; and we do hereby declare that the following is a full, clear, and exact description of said invention, which will enable others skilled in the art to which it appertains to make and use the same.

Our invention relates to certain new and useful improvements in hose-patches, by means of which a hose-patch is provided being simple in construction, effective in operation durable, and cheap in first cost.

More particularly, our invention relates to a hose patch, designed for adjustment upon a broken hose pipe, and capable of such adjustment thereon as to enable its being attached to the hose, at a point removed from the brake, and of being slipped side wise, over the brake in the said hose and of compressing the same at this point in such a manner as to effectually stop the flow of water therefrom.

The essential features of our invention consist of two circular sections united to form a complete circle, the same being of considerable length, and hinged together at two of the respective edges and of a clamping means consisting of a threaded tongue or plate hinged to the edge of one of the sections and of a worm screw properly supported in a frame work and journaled therein upon the opposite section and the edge thereof, and there being a hand hold upon the end of a shank provided extending outward from the end of the said worm screw to facilitate the turning of the said screw, and in other structural parts hereinafter to be mentioned, and particularly described.

Figure 1:
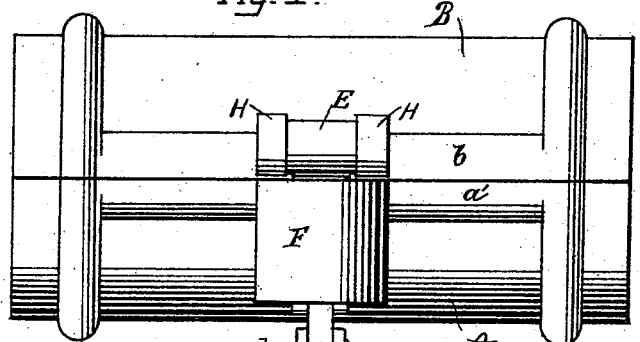
Figure 2:
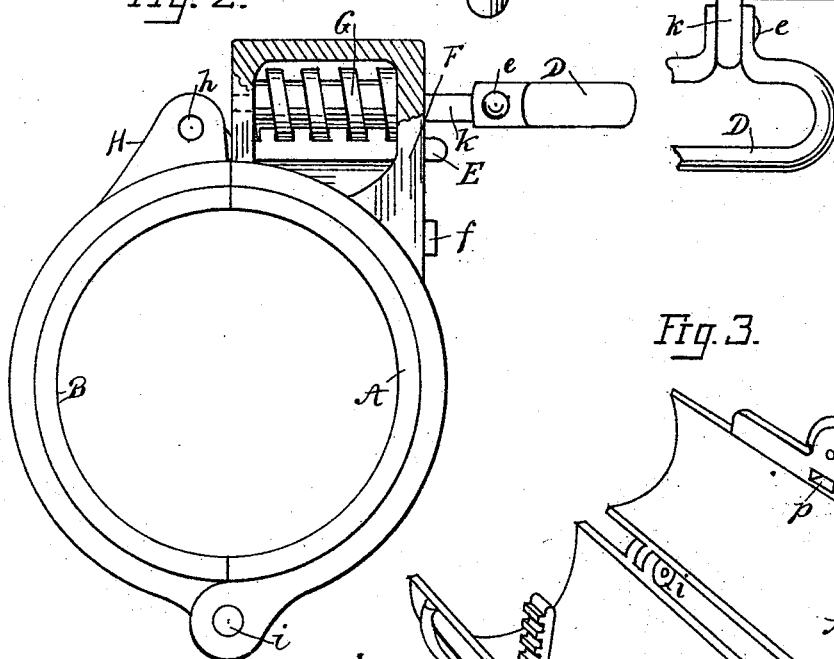
Figure 3:
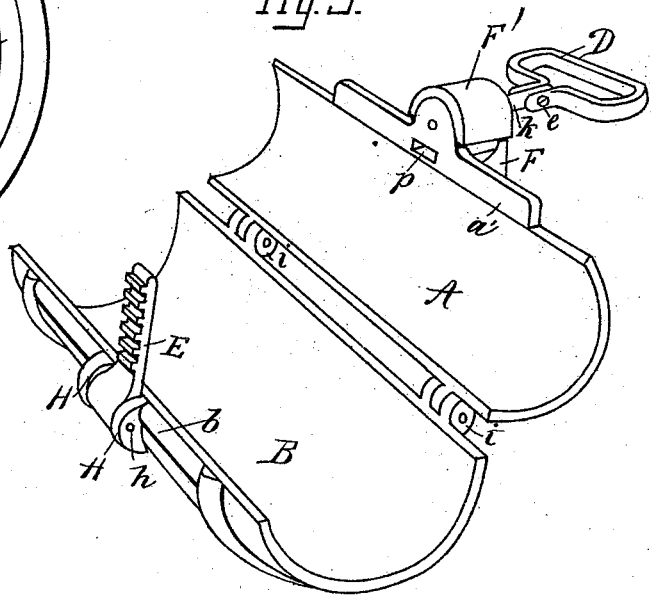

That our invention may be more fully understood, reference is had to the accompanying drawings, in which:

Figure 1 is a plan view of the device showing the sections closed. Fig. 2 is an end view. Fig. 3 shows the open sections in perspective.

In the figures, A—B are semi-circular sections, hinged together at corresponding edges, as at ($i$—$i$), and provided with suitable raised lips $a'$—$b$.

H are ears provided upon the section B, between which the threaded tongue E is pivoted, as at ($h$.)

F is a frame-work properly secured to the section A, and at the edge thereof opposite to the ears H, within which the threaded tongue E is pivoted.

G is a worm screw, journaled in the frame work F as shown, and provided with the elongated journal or shank ($k$) upon which at its outward extremity is pivoted the hand hold D, as at ($e$.)

F' is a cap, designed to cover the worm screw; ($p$) is a perforation through the lip ($a'$) to provide an entrance for the threaded tongue E; the adjustment of the various parts being relatively as shown in the different figures.

In operation for the purpose designed, namely, for closing a brake in a hose pipe, the open section as shown in Fig. 3, by adjustment, may be placed around the hose pipe, at any convenient point, adjacent to or immediately over the said brake in the hose pipe, and in closing the sections, the tongue E, is passed through the opening ($p$) and enters the frame work F immediately below and in such proximity to the worm screw G, that the threads upon the tongue E are readily engaged by the threads on the worm screw G the first engagement with the threads on the tongue E, being at its outer end, and by turning the hand hold D, the proper direction for turning the screw up, the sections A—B will be drawn together and when immediately over the brake in the hose pipe, may be tightly closed over the same to effectually prevent the escape of water therefrom, and may be released from the said hose pipe by the opposite turning of the said worm screw. The sections A—B, may or may not be lined with any suitable material to facilitate its operation as the exigency of the case or the particular application thereof may warrant or be desired.

The general form of the device, the material used therein, the location and arrangement of the various elements, the character of the screw used, and the application of the principle of the screw for clamping, may be varied, substituted, interchanged to suit the application in which they may be desired to be used.

Having thus fully described our invention, what we claim, and desire to secure by Letters Patent, is—

1. In a hose clamp, having two semi-cylindrical circles hinged together, the cogged tongue hinged to one of the sections, and the worm screw G, carried in a suitable frame work upon the other section, provided with suitable turning means and designed to operate connection with the cogged tongue, for the purpose of drawing the two sections together or expanding them, all substantially as described and set forth.

2. In a hose clamp, the combination, with the two semi-cylindrical sections hinged together, of the tongue hinged to one of the sections and having a cog formed upper face, the raised portion $a'$, having the slot P, the worm screw G for engaging the cogged tongue E, journaled in raised portion $a'$, and attached piece F, and having connected therewith the hand hold D, all substantially as described and set forth.

3. The combination in a hose clamp, of the following elements: sections A—B, hinged as at $(i—i)$, the threaded tongue E, pivoted as at $h$, in ears H upon section B; the screw G, journaled in the frame work F, and provided with the extension or elongated journal $k$, to the end of which, is secured the hand hold D, as at $(e)$ the frame work F, provided with the cap F', the ears $(a'—b)$ with the ear $(a')$ perforated as at $(p)$, all substantially as described and set forth.

In testimony whereof we affix our signatures in presence of two witnesses.

JOHN D. OTIS.
JAMES M. HARPER.

Witnesses:
JAMES C. ARMSTRONG,
W. V. TEFFT.